US012451625B2

(12) United States Patent
Yoshikawa

(10) Patent No.: US 12,451,625 B2
(45) Date of Patent: Oct. 21, 2025

(54) DEVICE CONNECTOR

(71) Applicant: SUMITOMO WIRING SYSTEMS, LTD., Mie (JP)

(72) Inventor: Masaaki Yoshikawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 427 days.

(21) Appl. No.: 18/082,234

(22) Filed: Dec. 15, 2022

(65) Prior Publication Data

US 2023/0208056 A1 Jun. 29, 2023

(30) Foreign Application Priority Data

Dec. 28, 2021 (JP) ................................ 2021-214381

(51) Int. Cl.

*H01R 9/24* (2006.01)
*H01R 9/22* (2006.01)
*H01R 13/502* (2006.01)
*H01R 13/52* (2006.01)

(52) U.S. Cl.

CPC ........... *H01R 9/2416* (2013.01); *H01R 9/223* (2013.01); *H01R 13/502* (2013.01); *H01R 13/5202* (2013.01)

(58) Field of Classification Search

CPC .. H01R 13/447; H01R 13/6215; H01R 9/223; H01R 13/46; H01R 13/502; H01R 13/5045; H01R 13/5202; H01R 13/5213

See application file for complete search history.

(56) References Cited

U.S. PATENT DOCUMENTS

| | | | | |
|---|---|---|---|---|
| 8,672,706 B2 * | 3/2014 | Matsumoto .......... | H01R 13/447 439/489 |
| 9,490,564 B2 * | 11/2016 | Nakayama ............. | H01R 13/41 |
| 10,062,974 B2 * | 8/2018 | Okamoto ................. | H01R 4/34 |
| 11,121,483 B2 * | 9/2021 | Nakai .................... | H01R 4/184 |
| 12,080,982 B2 * | 9/2024 | Fukuyama ............... | H01R 9/03 |
| 2018/0212354 A1 | 7/2018 | Umemura et al. | |

* cited by examiner

*Primary Examiner* — Renee S Luebke
*Assistant Examiner* — Paul D Baillargeon
(74) *Attorney, Agent, or Firm* — Venjuris, P.C.

(57) ABSTRACT

A device connector is provided with a terminal block including a resin housing having a tubular portion and three or more terminals, and a connector cover for covering one end side opening of the tubular portion. Connecting portions of the three or more terminals project from a first partial inner peripheral surface toward a second partial inner peripheral surface of the tubular portion. The connector cover includes an inserting portion to be inserted into the tubular portion, a resin cover portion having separation walls and a sealing ring. The plurality of separation walls respectively partition the three or more connecting portions. First ribs project along the first partial inner peripheral surface from each of the plurality of separation walls, and second ribs extend along the second partial inner peripheral surface from each of the plurality of separation walls.

9 Claims, 9 Drawing Sheets

DEVICE CONNECTOR

CROSS-REFERENCE TO RELATED APPLICATIONS

This application is based on and claims priority from Japanese Patent Application No. 2021-214381, filed on Dec. 28, 2021, with the Japan Patent Office, the disclosure of which is incorporated herein in its entirety by reference.

TECHNICAL FIELD

The present disclosure relates to a device connector.

BACKGROUND

Japanese Patent Laid-open Publication No. 2017-027756 discloses a connector provided with a housing made of synthetic resin and molded integrally to a plurality of terminals and a service cover made of synthetic resin for closing a work hole of the housing.

SUMMARY

To extend an insulation distance between adjacent ones of terminals, it is considered to provide the service cover with separation walls and arrange the separation walls between adjacent ones of the terminals.

If the separation walls are provided on the service cover, there is a possibility that the separation walls contact the inner peripheral surface of the work hole when the service cover is inserted into the work hole of the housing. It is desired to reduce a contact pressure of the separation walls with the inner peripheral surface of the work hole as much as possible. Note that the contact pressure is a force acting per unit area.

Accordingly, the present disclosure aims to reduce a contact pressure of separation walls with the inner peripheral surface of a tubular portion, also known as a hollow portion, as much as possible when a connector cover is inserted into the tubular portion of a resin housing.

The present disclosure is directed to a device connector with a terminal block including a resin housing having a tubular portion and three or more terminals each having a connecting portion, and a connector cover detachably mounted to cover one end side opening of the tubular portion, the tubular portion having an inner peripheral surface including a first partial inner peripheral surface and a second partial inner peripheral surface facing the first partial inner peripheral surface, the three or more terminals being supported while being partially covered by the resin housing with the respective connecting portions located in the tubular portion, the three or more connecting portions projecting from the first partial inner peripheral surface toward the second partial inner peripheral surface while being arranged at intervals in an arrangement direction intersecting a penetration direction of the tubular portion in the tubular portion, the connector cover including a cover body portion, an inserting portion to be inserted into the tubular portion, a resin cover portion having a plurality of separation walls extending from the inserting portion toward another end side of the tubular portion and a sealing ring configured to contact the inner peripheral surface of the tubular portion by being mounted on an outer periphery of the inserting portion, the plurality of separation walls respectively extending further toward another end side opening of the tubular portion than the connecting portions at positions for partitioning the three or more connecting portions and overlapping from base ends to tips of the three or more connecting portions in a projecting direction of the connecting portions, and the resin cover portion further including first ribs extending from first end parts of the plurality of separation walls located on base end sides of the connecting portions and near the other end side opening of the tubular portion along the first partial inner peripheral surface and second ribs extending from second end parts of the plurality of separation walls located on tip sides of the connecting portions and near the other end side opening of the tubular portion along the second partial inner peripheral surface.

According to the present disclosure, a contact pressure of separation walls with the inner peripheral surface of a tubular portion can be reduced as much as possible when a connector cover is inserted into the tubular portion of a resin housing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
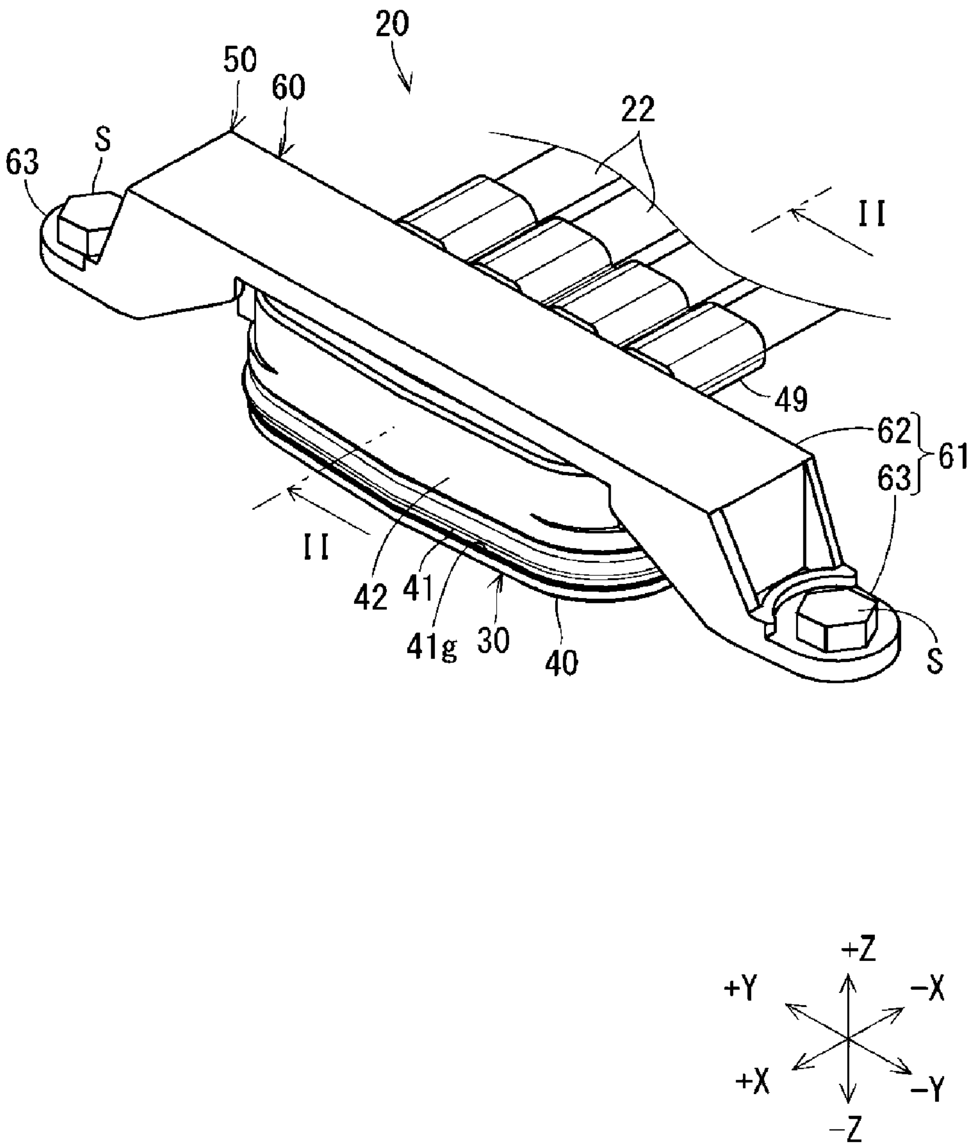
FIG. 1 is a perspective view showing a device connector according to an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

The device connector of the present disclosure is as follows.

(1) The device connector is provided with a terminal block including a resin housing having a tubular portion, also known as a hollow portion, and three or more terminals each having a connecting portion, and a connector cover detachably mounted to cover one end side opening of the tubular portion, the tubular portion having an inner peripheral surface including a first partial inner peripheral surface and a second partial inner peripheral surface facing the first partial inner peripheral surface, the three or more terminals being supported while being partially covered by the resin housing with the respective connecting portions located in the tubular portion, the three or more connecting portions projecting from the first partial inner peripheral surface toward the second partial inner peripheral surface while being arranged at intervals in an arrangement direction intersecting a penetration direction of the tubular portion in the tubular portion, the connector cover including a cover body portion, an inserting portion to be inserted into the tubular portion, a resin cover portion having a plurality of separation walls extending from the inserting portion toward another end side of the tubular portion and a sealing ring configured to contact the inner peripheral surface of the tubular portion by being mounted on an outer periphery of the inserting portion, the plurality of separation walls respectively extending further toward another end side opening of the tubular portion than the connecting portions at positions for partitioning the three or more connecting portions and overlapping from base ends to tips of the three or more connecting portions in a projecting direction of the connecting portions, and the resin cover portion further including first ribs extending from first end parts of the plurality of separation walls located on base end sides of the connecting portions and near the other end side opening of the tubular portion along the first partial inner peripheral surface and second ribs extending from second end parts of the plurality of separation walls located on tip sides of the connecting portions and near the other end side opening of the tubular portion along the second partial inner peripheral surface.

According to the present disclosure, the separation walls extend toward the tip side in an inserting direction with respect to the sealing ring. Thus, if the connector cover is inserted into the tubular portion, there is a possibility that outward facing parts of the separation walls on the tip side in the inserting direction abut on the inner peripheral surface of the tubular portion. Even if the separation walls abut on the inner peripheral surface of the tubular portion, the first ribs extending along the first partial inner peripheral surface or the second ribs extending along the second partial inner peripheral surface abut on the inner peripheral surface. Thus, a contact area of the resin cover portion and the inner peripheral surface can be increased as compared to the case where the first and second ribs are absent. In this way, a contact pressure of the separation walls with the inner peripheral surface of the tubular portion can be reduced as much as possible when the connector cover is inserted into the resin housing.

(2) In the device connector of (1), the first and second ribs may extend up to the inserting portion. In this case, the inserting portion can be reinforced and made less likely to be deformed by the first and second ribs. In this way, sealability by the sealing ring provided on the outer periphery of the inserting portion can be enhanced.

(3) In the device connector of (1) or (2), the second ribs may extend to connect between the plurality of separation walls. The strength of each separation wall can be improved and an insulation distance can be increased.

(4) In the device connector of any one of (1) to (3), a gap may be provided between the second ribs and the second partial inner peripheral surface. In this case, since the gap is provided between the second ribs and the second partial inner peripheral surface, the inserting portion is easily inserted into the tubular portion.

(5) In the device connector of any one of (1) to (4), a Rockwell hardness value HR of the resin cover portion may be larger than a Rockwell hardness value HR of the resin housing. In this way, a sealed state is easily maintained by pressing the resin housing by the resin cover portion.

(6) In the device connector of any one of (1) to (5), the first and second partial inner peripheral surfaces may be facing each other at a constant interval in the projecting direction of the connecting portions in a section in an inserting direction of the inserting portion from a sealing position by the sealing ring to a position at least partially overlapping the separation walls. In this way, a region of the tubular portion where the sealing position by the sealing ring is arranged can be reduced to such an extent that the separation walls can be passed. In this way, the resin cover portion can be reduced in size.

(7) In the device connector of any one of (1) to (6), parts of the connector cover to be inserted into the tubular portion and closest to the first and second partial inner peripheral surfaces on a tip side in the inserting direction may be the separation walls. If the parts of the connector cover to be inserted into the tubular portion and closest to the first and second partial inner peripheral surfaces on the tip side in the inserting direction are the separation walls, the separation walls easily abut on the first or second partial inner peripheral surface. In such a case, the contact pressure of the separation walls with the inner peripheral surface of the tubular portion can be reduced as much as possible.

(8) In the device connector of any one of (1) to (7), the cover body portion may include a screw fixing portion to be screwed to a device to be attached. In this way, even if the separation walls abut on the inner peripheral surface before or at the time of screw tightening, the contact pressure of the separation walls with the inner peripheral surface of the tubular portion can be reduced as much as possible.

(9) In the device connector of any one of (1) to (8), one of the terminal block and the connector cover may include a guide groove and the other may include a guided portion to be guided by the guide groove, the guide groove may be a groove for restricting a passage route of the inserting portion in the tubular portion, and the guide groove may be formed to guide the guided portion before end parts of the separation walls near the other end side opening of the tubular portion reach a contact position of the inner peripheral surface with the sealing ring. In this case, the separation walls are made less likely to contact the position of the inner peripheral surface to be contacted by the sealing ring. In this way, a part of the inner peripheral surface contacted by the sealing ring is easily maintained as a smooth surface suitable for sealing.

Details of Embodiment of Present Disclosure

A specific example of a device connector of the present disclosure is described below with reference to the drawings. Note that the present disclosure is not limited to these illustrations, but is represented by claims and intended to include all changes in the scope of claims and in the meaning and scope of equivalents.

Embodiment

Overall Configuration

Figure 2:
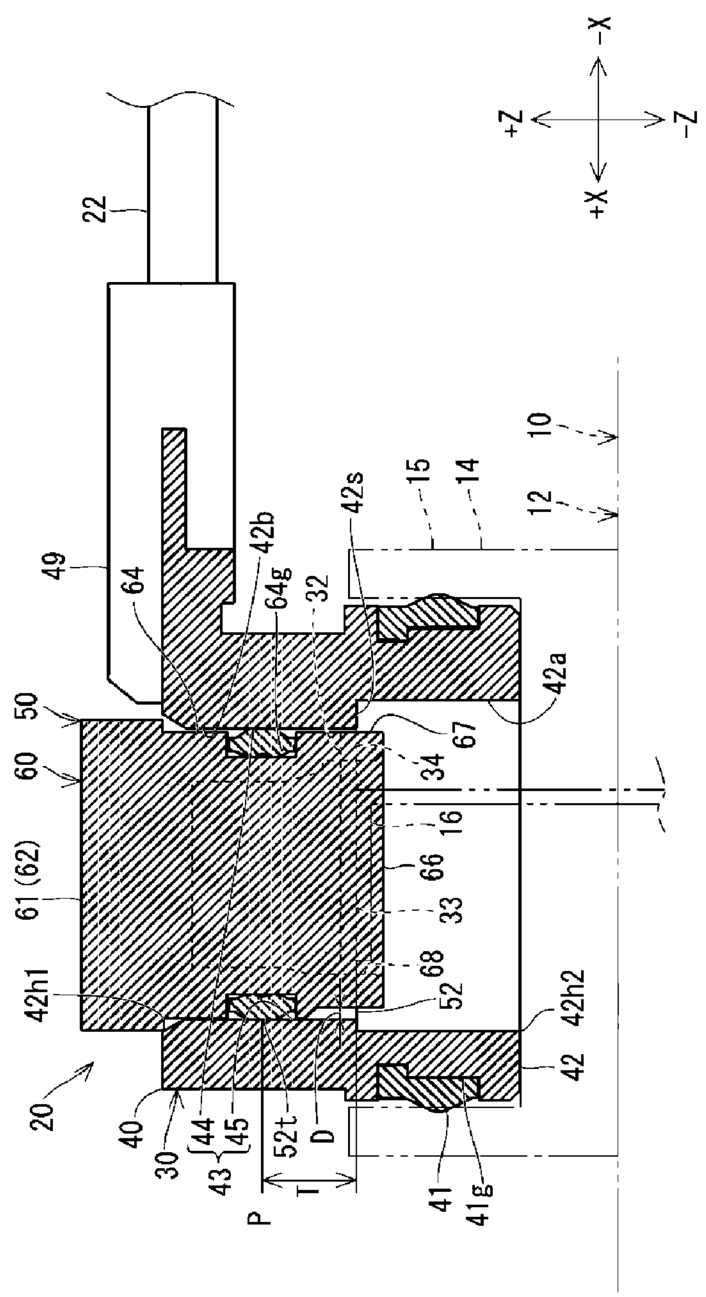
FIG. 2 is a section along II-II of FIG. 1.
Figure 3:
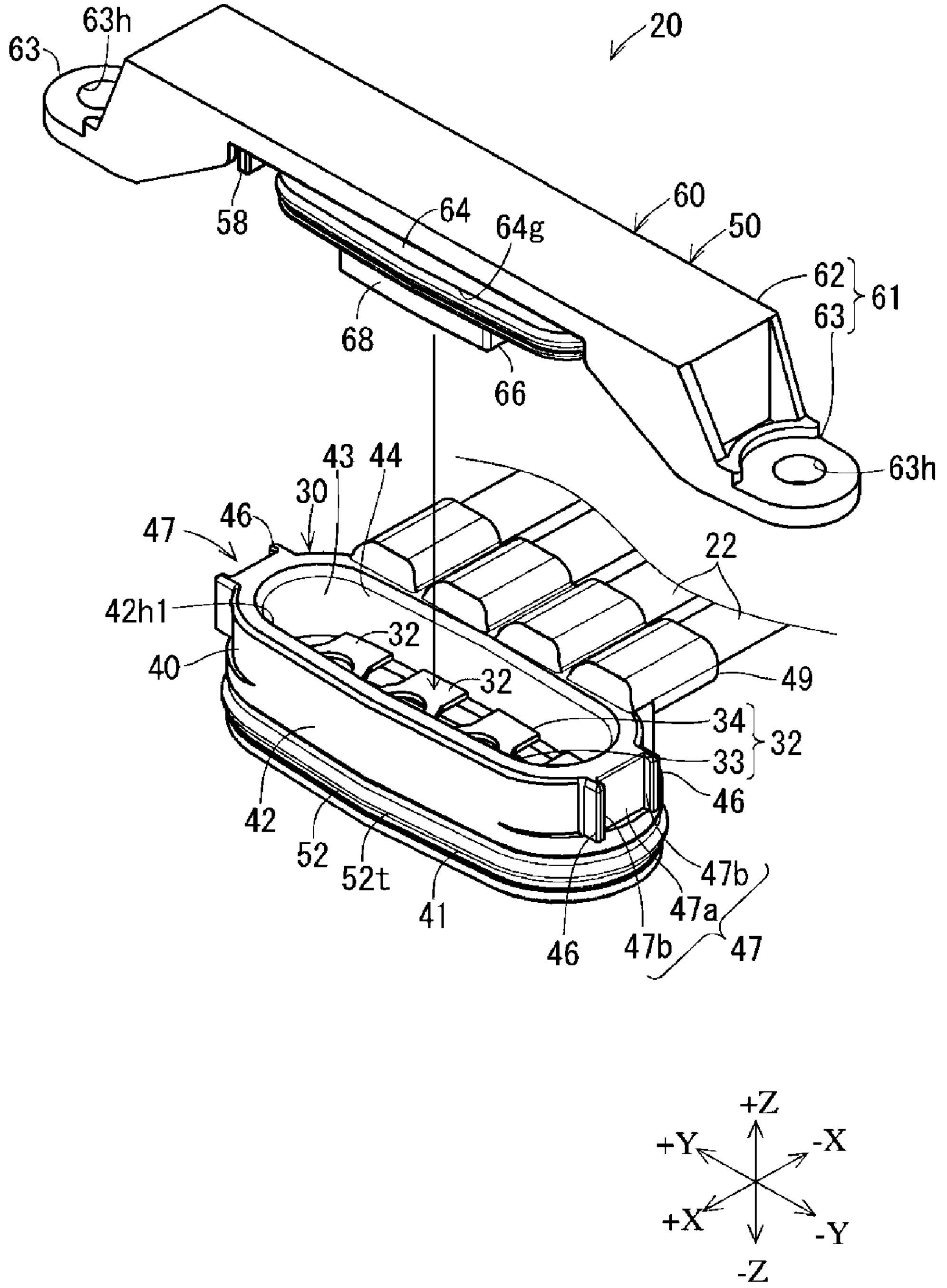
FIG. 3 is an exploded perspective view showing the device connector.
Figure 4:
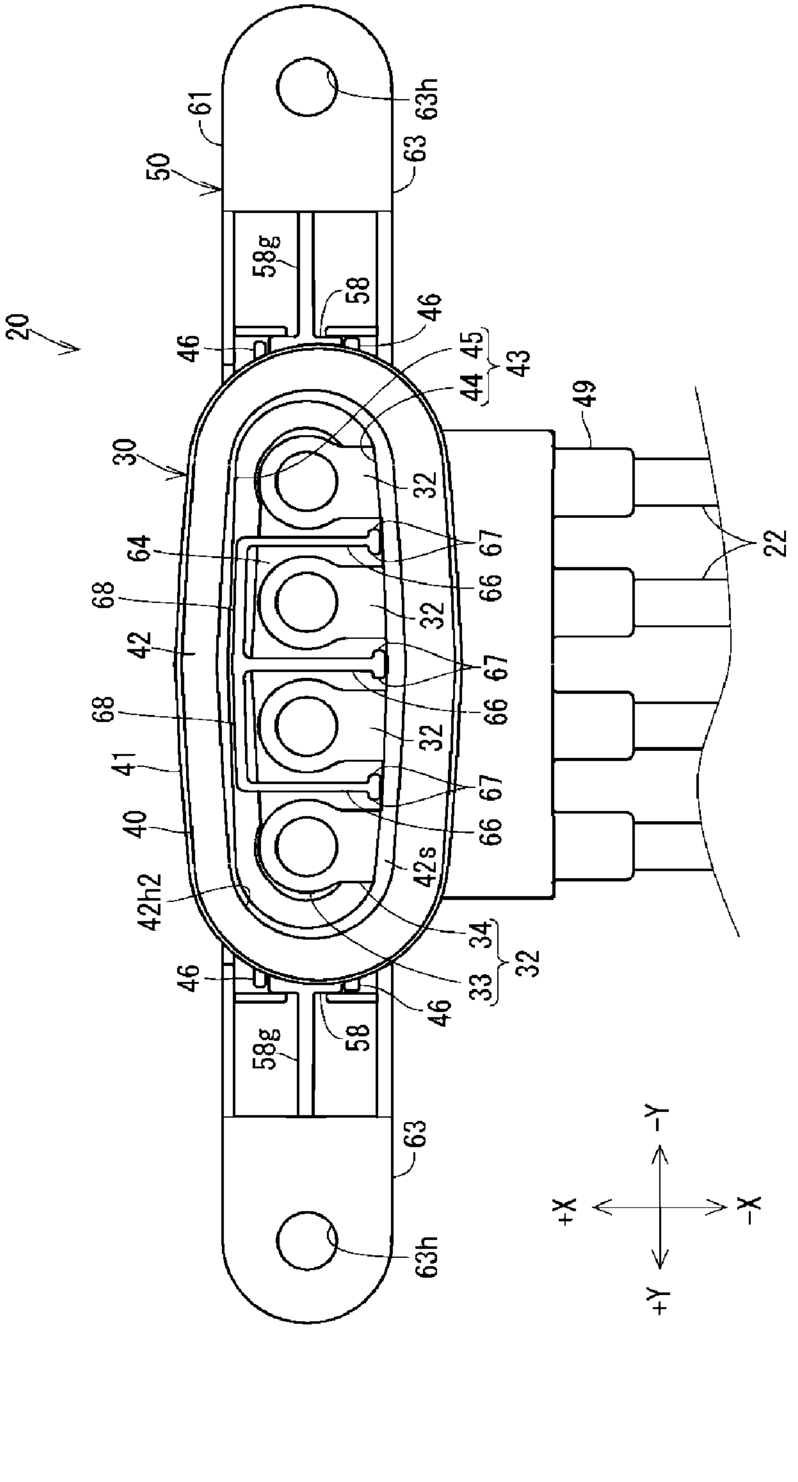
FIG. 4 is a bottom view of the device connector.

Hereinafter, a device connector according to an embodiment is described. FIG. 1 is a perspective view showing a device connector 20. FIG. 2 is a section along II-II of FIG. 1. In FIG. 2, a device 10 to which the device connector 20 is attached is shown by two-dot chain lines. FIG. 3 is an exploded perspective view showing the device connector 20. FIG. 4 is a bottom view of the device connector 20. For the convenience of description, an axial direction of a tubular portion 42, also known as a hollow portion, to be described later is referred to as a Z direction, and a direction toward the device 10 and a direction away from the device 10 along the Z direction are referred to as a −Z direction and +Z direction in some cases. Further, an extending direction of terminals 32 in the tubular portion 42 is referred to as an X direction, and a direction toward tip sides of the terminals 32 and a direction toward base end sides of the terminals 32 are referred to as a +X direction and a −X direction in some cases. Further, a direction orthogonal to the Z and X directions is referred to as a Y direction and a direction toward one side and a direction toward the other side along the Y direction are referred to as a +Y direction and a −Y direction in some cases.

The device connector 20 is a connector for connecting wires 22 to the device 10.

Here, the device 10 is a device to be installed in a vehicle (see FIG. 2). The device 10 is, for example, an inverter or motor. The device 10 includes a case 12 and a device-side terminal block 14. In-device electrical components of the device 10 are accommodated in the case 12. The device-side terminal block 14 including a tubular portion 15, also known as a hollow portion, is mounted on the outer peripheral surface of the case 12. The device-side terminal block 14 is, for example, formed of resin or the like. Device-side terminals 16 extend into the tubular portion 15 from the case 12. A base end part of the device-side terminal 16 is connected to the in-device electrical component in the case 12. A tip part of the device-side terminal 16 is bent to be perpendicular (X-X direction) with respect to an axis of the tubular portion 15. A hole, through which a screw is inserted, is formed in the tip part of the device-side terminal 16.

By connecting the device connector 20 to the device-side terminal block 14, the wires 22 from outside are electrically connected to the in-device electrical components. In this way, power is supplied to the device 10 from outside. The device connector 20 is provided with a terminal block 30 and a connector cover 50.

The terminal block 30 includes the terminals 32. By uniting the terminal block 30 with the device-side terminal block 14, the terminals 32 are arranged at positions to contact the device-side terminals 16. The terminals 32 are fixed to the device-side terminals 16 by screwing.

The connector cover 50 covers connected parts of the terminals 32 and the device-side terminals 16 by being united with the terminal block 30. The connector cover 50 is mounted on the terminal block 30 when the vehicle is manufactured. Further, the connector cover 50 may be detached from and attached to the device-side terminal block 14 also at the time of maintenance of the vehicle and the like.

The terminal block 30 and the connector cover 50 are more specifically described below.

<Terminal Block>

The terminal block 30 includes a resin housing 40 and three or more terminals 32.

The terminal 32 includes a connecting portion 33 and is connected to an end part of the wire 22. The connecting portion 33 is a part to be connected to the device-side terminal 16, e.g. a holed plate-like part. In this embodiment, the terminal 32 is a round crimping terminal and a disk-like part including a hole on a tip part is a connecting direction. Here, the terminal block 30 includes four terminals 32, and each of the four terminals 32 is connected to the end part of the wire 22. Note that the numbers of the terminals 32 and the wires 22 are arbitrary as long as these numbers are three or greater.

The resin housing 40 is a part formed of resin for holding the terminals 32. The resin housing 40 includes the tubular portion 42. The terminals 32 are held in the tubular portion 42.

More specifically, the tubular portion 42 has a tube shape long in one direction (Y direction) and short in another direction (X direction) when viewed along the axial direction of the tubular portion 42. For example, the tubular portion 42 has such a tube shape that semicylindrical parts are connected to both sides of two rectangular plate-like parts spaced apart from and facing each other. An inner peripheral surface 43 of the tubular portion 42 has a first partial inner peripheral surface 44 and a second partial inner peripheral surface 45. The first and second partial inner peripheral surfaces 44, 45 have a rectangular shape long in the one direction (Y direction) and short in the axial direction (Z direction) of the tubular portion 42. The first and second partial inner peripheral surfaces 44, 45 are spaced apart and facing in the X direction.

A step portion **42*s* facing a −Z side (device side) is formed in an intermediate part in the Z direction of the inner peripheral surface 43 (see FIG. 2). A part 42*a* of the inner peripheral surface 43 on the device side expands further than a part 42*b* outside the device via the step portion 42*s*. One end side opening 42*h*1 of the tubular portion 42 is facing outward of the device 10. Another end side opening 42*h*2 of the tubular portion 42 is facing toward the device 10**.

With the connector cover 50 united with the terminal block 30, a later-described sealing ring 52 of the connector cover 50 is in contact with the inner peripheral surface 43 along a circumferential direction of the inner peripheral surface 43. In this way, a gap between the terminal block 30 and the connector cover 50 is sealed.

The three or more terminals 32 are partially covered and supported by the resin housing 40 with the connecting portions 33 thereof located in the tubular portion 42. Three or more connecting portions 33 are arranged at intervals in an arrangement direction (Y direction) intersecting a penetration direction of the tubular portion 42 in the tubular portion 42. Each connecting portion 33 projects from the first partial inner peripheral surface 44 toward the second partial inner peripheral surface 45. As described above, the connecting portion 33 projects toward a +X side, and an opposite side is a −X side. Gaps are present between the respective connecting portions 33. A gap is present between the tips of the respective connecting portions 33 and the second partial inner peripheral surface 45. A tip part of each connecting portion 33 is formed into a round plate, and a coupling portion 34 narrower than the connecting portion 33 is connected to the base end of each connecting portion 33 on the side of the first partial inner peripheral surface 44. The respective connecting portions 33 are supported at positions corresponding to the respective device-side terminals 16.

The connecting portion 33 is located in a middle of the inner peripheral surface 43 in the Z direction, which is the axial direction of the tubular portion 42. More specifically, the connecting portion 33 is located in the part **42*b* outside the device. In this embodiment, a surface of the connecting portion 33 facing the device 10 is arranged at a position flush and continuous with a surface of the step portion 42*s*. A surface parallel to the Z direction is continuous on a side of the inner peripheral surface 43 of the tubular portion 42 more outward of the device 10 than the terminal 32**.

A part of the terminal 32 connected to the wire 22 is embedded in the resin housing 40. The wire 22 is pulled out to the outside of the first partial inner peripheral surface 44 of the resin housing 40. A wire holding portion 49 is formed to project on an outer peripheral side of the first partial inner peripheral surface 44 of the resin housing 40. An end part of the wire 22 on the side of the terminal 32 is pulled out to the outside of the wire holding portion 49 through the inside of the wire holding portion 49.

The resin housing 40 includes guide grooves 47. In this embodiment, the guide groove 47 is formed by inner surfaces of a pair of guide wall portions 46 and a surface 47*a* between those inner surfaces. That is, the pair of guide wall portions 46 separated in the X direction are formed on each of both ends in the Y direction of an outer peripheral part of the resin housing 40. The guide groove bottom surface 47*a* between the pair of guide wall portions 46, out of the outer peripheral part of the resin housing 40, is formed into a flat surface perpendicular to the Y direction. The guide groove 47 is formed into a shape having inner guide side surfaces 47*b* of the pair of guide wall portions 46 and the guide groove bottom surface 47*a*. The guide grooves 47 are formed on both ends in the Y direction of the resin housing 40.

An outer seal mounting groove 41*g* is formed in a part near the device 10, out of the outer peripheral part of the resin housing 40. An outer sealing ring 41 is mounted into the outer seal mounting groove 41*g*. The outer sealing ring 41 is an annular member formed of a resilient material such as rubber. With the resin housing 40 inserted in the tubular portion 15 of the device-side terminal block 14, an outer peripheral part of the outer sealing ring 41 is in contact with the inner peripheral surface of the tubular portion 15. In this way, sealing is provided between the resin housing 40 and the device-side terminal block 14.

<Connector Cover>

Figure 5:
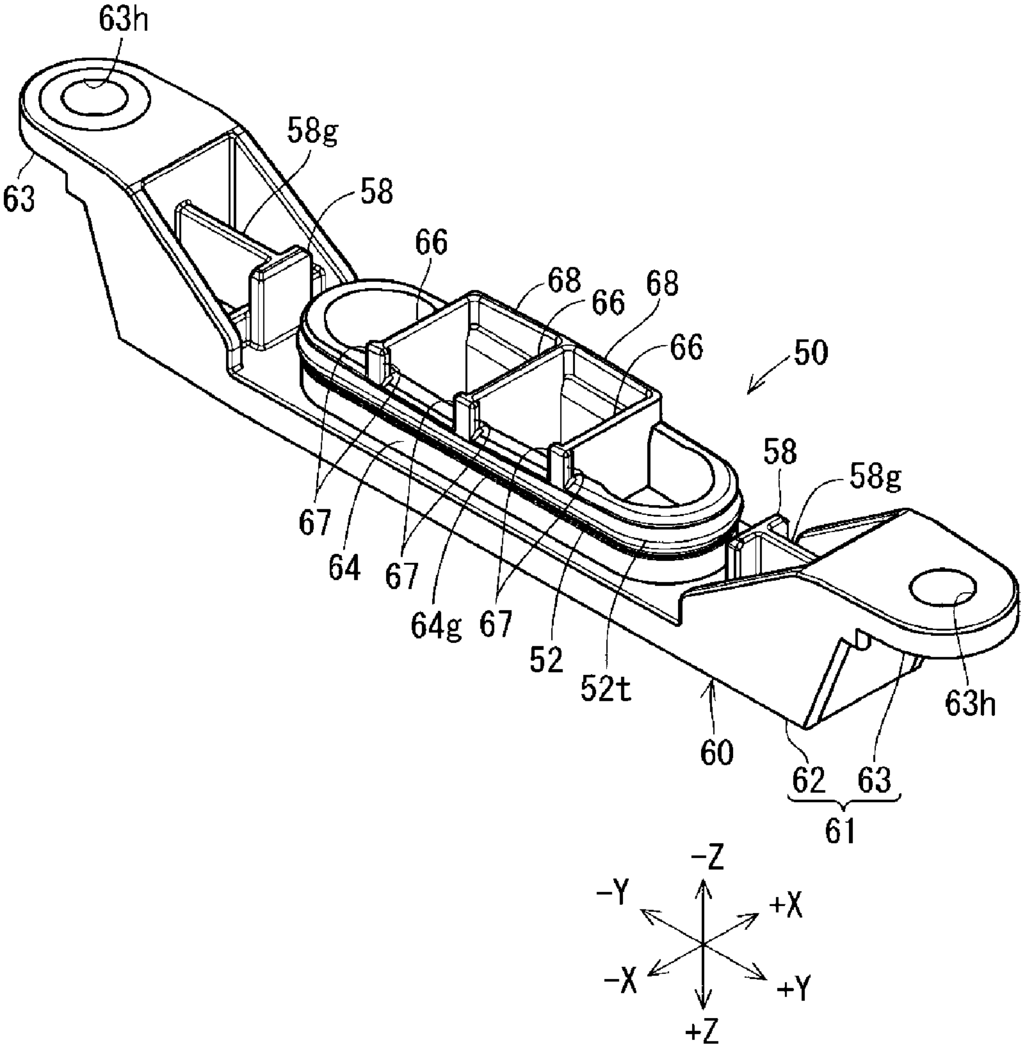
FIG. 5 is a perspective view of a connector cover viewed from a device side.

FIG. 5 is a perspective view of the connector cover 50 viewed from the side of the device 10. As shown in FIGS. 1 to 5, the connector cover 50 is detachably mounted to cover the one end side opening 42*h*1 of the tubular portion 42 outside the device 10. The connector cover 50 includes a resin cover portion 60 and a sealing ring 52.

The resin cover portion 60 is a part formed of resin. Here, a Rockwell hardness value HR of the resin forming the resin cover portion 60 is preferably larger than a Rockwell hardness value HR of the resin forming the resin housing 40. A hardness of a resin is determined, for example, by properties of a base material itself, an amount of reinforcing substances mixed into the base material or the like. For example, since PA6T (polyamide 6T) is harder than PBT (polybutylene terephthalate), the resin cover portion 60 may be formed of PA6T and the resin housing 40 may be formed of PBT. Further, the resin becomes harder as more reinforcing fiber such as glass fiber is mixed into the base material. Thus, a mixing ratio of the reinforcing fiber in the resin of the resin cover portion 60 may be set higher than that of the reinforcing fiber in the resin of the resin housing 40. A final resin hardness is set by a hardness of the base material itself, a mixing ratio of reinforcing substances and the like. Thus, the base materials and the mixing ratios of the reinforcing substances of the respective resins may be so set that the Rockwell hardness value HR of the resin forming the resin cover portion 60 is larger than the Rockwell hardness value HR of the resin forming the resin housing 40. The Rockwell hardness value HR is tested, for example, by a test method specified by JIS Z 2245.

By setting the Rockwell hardness value HR of the resin cover portion 60 larger than the Rockwell hardness value HR of the resin housing 40, the resin cover portion 60 can effectively press the resin housing 40 toward the device 10. For example, the resin housing 40 seals an opening of the tubular portion 42 integrally with the sealing ring 52. Thus, there is a possibility that the resin housing 40 is pushed outwardly of the device 10 by the expansion of air in the device 10. In such a case, the connector cover 50 fixed to the device 10 by screwing or the like presses the resin housing 40 toward the device 10. If the resin cover portion 60 is formed to be harder than the resin housing 40, the connector cover 50 itself is hardly deformed, thereby easily maintaining a state where the connector cover 50 presses the resin housing 40 in a constant state.

The resin cover portion 60 includes a cover body portion 61, an inserting portion 64 and a plurality of separation walls 66. The resin cover portion 60 is, for example, a component integrally molded of the same resin.

The cover body portion 61 includes a pressing portion 62 and a pair of screw fixing portions 63. The pressing portion 62 is in the form of an elongated rectangular plate. A dimension of the pressing portion 62 in a longitudinal direction (Y direction) is equal to or longer than a dimension of the inner peripheral surface 43 of the tubular portion 42 in the longitudinal direction (Y direction), and a dimension of the pressing portion 62 in a transverse direction (X direction) is equal to or longer than a dimension of the inner peripheral surface 43 of the tubular portion 42 in the transverse direction (X direction). Thus, the pressing portion 62 can cover the one side end opening 42*h*1 of the tubular portion 42 from outside.

Both end parts of the pressing portion 62 protrude outward from both ends in the longitudinal direction of the tubular portion 42. The pair of screw fixing portions 63 are connected to both ends of the pressing portion 62. The screw fixing portion 63 is formed into an L-shaped leg portion extending toward the device 10 from the end of the pressing portion 62 and extending along a fixing object surface on the side of the device 10 at a position reaching the device 10. A screw insertion hole 63*h* is formed in an end part of the screw fixing portion 63. A screw S such as a bolt is inserted into the screw insertion hole 63*h* and threadably fastened to a nut part on the side of the device 10. In this way, the cover body portion 61 presses the tubular portion 42 toward the device 10.

The inserting portion 64 is a part projecting from a surface of the pressing portion 62 facing toward the device 10. In this embodiment, the inserting portion 64 is formed to be open toward the device 10. It is supposed that head parts of screws for fastening the terminals 16 and 32 are accommodated in an internal space of the inserting portion 64. For example, the outer peripheral surface of the inserting portion 64 has the same shape as or is smaller than the part 42*b* of the inner peripheral surface 43 outside the device 10 to such an extent that the inserting portion 64 is insertable into the tubular portion 42. A projection dimension of the inserting portion 64 is smaller than a distance between the one end side opening 42*h*1 of the tubular portion 42 and the connecting portions 33 of the terminals 32. With the inserting portion 64 inserted in the tubular portion 42, the pressing portion 62 is in contact with an end surface on one end side of the tubular portion 42 to restrict the position of the inserting portion 64 in an inserting direction. In this state, a tip part of the inserting portion 64 is located above the connecting portions 33.

A seal mounting groove 64*g* is formed in an intermediate part in the axial direction (Z direction) of the inserting portion 64 on the outer peripheral surface of the inserting portion 64. The seal mounting groove 64*g* is an annular groove along a circumferential direction of the inserting portion 64.

The sealing ring 52 is an annular member formed of a resilient material such as rubber. By fitting this sealing ring 52 into the seal mounting groove 64*g*, the sealing ring 52 is mounted on the inserting portion 64. With the inserting portion 64 inserted in the tubular portion 42, the sealing ring 52 is in contact with the part 42*b* outside the device 10, out of the inner peripheral surface 43 of the tubular portion 42. In this way, sealing is provided between the inner peripheral surface 43 of the tubular portion 42 and the inserting portion 64.

An intermediate part in the axial direction of the outer peripheral surface of the sealing ring 52 is formed to project most. An annular part projecting most, out of the outer peripheral surface of the sealing ring 52, is an annular top part 52*t*. A position where this annular top part 52*t* is pressed against the inner peripheral surface 43 with the sealing ring 52 sealing between the inner peripheral surface 43 of the tubular portion 42 and the inserting portion 64 is a sealing position P by the sealing ring 52 in the inserting direction (Z direction) of the inserting portion 64. The sealing position P is referred to in later description.

In the inserting direction (Z direction) of the inserting portion 64, the first and second partial inner peripheral surfaces 44, 45 are facing each other at a constant interval in the projecting direction (X direction) of the connecting portions 33 in a section from the sealing position P to the connecting portions 33. That is, in a cross-section parallel to an XZ plane, the first and second partial inner peripheral surfaces 44, 45 are parallel in the section from the sealing position P to the connecting portions 33.

The plurality of separation walls 66 are provided at positions for partitioning the three or more connecting portions 33. In this embodiment, the four connecting portions 33 are arranged at intervals in the Y direction, and the separation walls 66 are located at three positions between adjacent ones of the connecting portions 33. The separation walls 66 extend further toward the other end side opening (−Z side) of the tubular portion 42 than the connecting portions 33, and the tips of the separation walls 66 are located beyond the connecting portions 33 toward the device 33 with the inserting portion 64 inserted in the tubular portion 42. Thus, external matters present between the connecting portions 33 can be pushed out from between the connecting portions 33. Further, the separation walls 66 are overlapping from the base ends to the tips of the three or more connecting portions 33 in the projecting direction (X direction) of the connecting portions 33. The separation walls 66 are preferably overlapping at least parts of the coupling portions 34 in the X direction. The separation walls 66 function to increase an insulation distance between the connecting portions 33 by entering between the plurality of connecting portions 33.

A relationship of the separation walls 66 and the sealing position P is described. As described above, the tip of the inserting portion 64 is located away from the connecting portions 33 toward the one end side opening 42*h*1 of the tubular portion 42. The separation walls 66 extend from the tip of the inserting portion 64 toward the other end opening 42*h*2 of the tubular portion 42 beyond the connecting portions 33. Thus, a part (side of the part 42*b*) where the first and second partial inner peripheral surfaces 44, 45 are facing each other at a constant interval in the projecting direction of the connecting portions 33 is present in a section T in the inserting direction of the inserting portion 64 from the sealing position P to a position at least partially overlapping the separation walls 66 (see FIG. 2).

The resin cover portion 60 includes first ribs 67 and second ribs 68 connected to the plurality of separation walls 66. The first and second ribs 67, 68 are described in more detail below.

<First Ribs and Second Ribs>

The first rib 67 extends from a first end part of each of the plurality of separation walls 66 located on a base end side (−X side) of the connecting portion 33 and near the other end side opening (−Z side) of the tubular portion 42 along the first partial inner peripheral surface 44. In this embodiment, the first rib 67 is located between the coupling portions 34 on the base end sides of the connecting portions 33.

The first rib 67 may extend from the separation wall 66 toward one side or toward both sides in a thickness direction of the separation wall 66. In this embodiment, the first rib 67 extends from the separation wall 66 toward the both sides in the thickness direction of this separation wall 66. Thus, when observed from tip sides of the separation wall 66 and the first rib 67, two ribs extend with respect to the separation wall 66 to form a T shape. A surface of the first rib 67 facing the base end side (−X side) of the coupling portion 33 is continuously connected to an extension of a surface of the separation wall 66 facing the base end side (−X side) of the coupling portion 33. Thus, outward facing surfaces of the separation wall 66 and the first rib 67 can simultaneously contact the inner peripheral surface 43 of the tubular portion 42.

The first rib 67 may be provided at least on a tip side (−Z side) of the separation wall 66. In this embodiment, the first rib 67 extends from the tip side of the separation wall 66 to the inserting portion 64, which is the base end side, in the Z direction and is connected to the inserting portion 64.

Gaps are provided between the first ribs 67 respectively connected to the plurality of separation walls 66. The coupling portions 34 connected to the base end sides of the connecting portions 33 are arranged in these gaps.

The second rib 68 extends from a second end part of each of the plurality of separation walls 66 located on a tip side (+X side) of the connecting portion 33 and near the other end side opening (−Z side) of the tubular portion 42 along the second partial inner peripheral surface 45.

The second rib 68 may extend from the separation wall 66 toward one side or toward both sides in the thickness direction of the separation wall 66. In this embodiment, the second ribs 68 extend to connect between the plurality of separation walls 66. Thus, the second ribs 68 extend toward a center in an arrangement direction of the separation walls 66 from the separation walls on both ends in the arrangement direction of the plurality of separation walls 66, and the second ribs 68 extend outward in the arrangement direction from the middle separation wall.

A surface of the second rib 68 facing the tip side (+X side) of the coupling portion 33 is continuously connected to an extension of a surface of the separation wall 66 facing the tip side (+X side) of the coupling portion 33. Thus, outward facing surfaces of the separation wall 66 and the second rib 68 can simultaneously contact the inner peripheral surface 43 of the tubular portion 42.

However, it is not essential that the second ribs extend to connect between the separation walls 66, and the second ribs may extend to provide gaps between the separation walls 66 similarly to the first ribs 67.

The second rib 68 may be provided at least on the tip side (−Z side) of the separation wall 66. In this embodiment, the second rib 68 extends from the tip side of the separation wall 66 to the inserting portion 64, which is the base end side, in the Z direction and is connected to the inserting portion 64. Thus, the connecting portion 33 in the middle in the arrangement direction, out of the plurality of connecting portions 33, can be surrounded on three sides, i.e. both ends and the tip side, by the separation walls 66 and the second rib 68 and an insulation distance between the connecting portions 33 can be extended.

If the connector cover 50 is observed on the whole, parts of the connector cover 50 to be inserted into the tubular portion 42 and closest to the first and second partial inner peripheral surfaces 44, 45 on the tip side (−Z direction) in the inserting direction are two corner parts on the tip side of each separation wall 66. Thus, there is a possibility that the corner parts of the separation walls 66 contact the inner peripheral surface 43 of the tubular portion 42 when the connector cover 50 is inserted into the tubular portion 42. The outward facing surfaces of the first and second ribs 67, 68 extend outward in the thickness direction of the separation walls 66 continuously from the corner parts of the separation walls 66. Thus, the outward facing surfaces of the first ribs 67 or those of the second ribs 68 can simultaneously contact the inner peripheral surface 43 when either one of the two corner parts on the tip side of each separation wall contacts the inner peripheral surface 43.

With the connector cover 50 united with the terminal block 30, the first ribs 67 and the first partial inner peripheral surface 44 may be in contact or separated. To more improve insulation between the connecting portions 33, an interval between the first ribs 67 and the first partial inner peripheral surface 44 is preferably as small as possible.

With the connector cover 50 united with the terminal block 30, a gap is provided between the second ribs 68 and the second partial inner peripheral surface 45. Since the second ribs 68 for closing spaces between the separation walls 66 are present on the tip sides of the connecting portions 33, a sufficient insulation distance is secured on the tip sides of the connecting portions 33. Thus, a distance D (see FIG. 2) between the second ribs 68 and the second partial inner peripheral surface 45 may be longer than a distance between the first ribs 67 and the first partial inner peripheral surface 44.

Thus, for example, for the purpose of more improving insulation, the gap can be provided between the second ribs 68 and the second partial inner peripheral surface 45 while the distance between the first ribs 67 and the first partial inner peripheral surface 44 is reduced as much as possible. In this way, the sizes of the inserting portion 64 and the separation walls 66 are easily reduced with respect to the interval between the first and second partial inner peripheral surfaces 44, 45, and an inserting operation of the inserting portion 64 and the separation walls 66 can be facilitated.

<Guide Structure>

The resin cover portion 60 includes guided portions 58 to be guided by the pair of guide grooves 47 shown in FIG. 3. The guide grooves 47 restrict a passage route of the inserting portion 64 in the tubular portion 42 by guiding the guided portions 58.

More specifically, the guided portions 58 are formed on both ends of the pressing portion 62 inside the screw fixing portions 63 as shown in FIG. 5. The guided portion 58 is in the form of an elongated plate projecting toward the device 10 from an end of a surface of the pressing portion 62 on the side of the device 10. Although a reinforcing piece 58*g* is provided between the guided portion 58 and the screw fixing portion 63, this is not essential.

The guided portion 58 is formed to have such a width that the guided portion 58 can be arranged between the pair of guide side surfaces 47*b* of the guide groove 47. By arranging the guided portion 58 between the pair of guide side surfaces 47*b*, a position in the X direction and inclination about the Y direction are restricted.

Further, the pair of guided portions 58 are respectively arranged to be able to contact the guide groove bottom surfaces 47*a* of the pair of guide grooves 47. The pair of guided portions 58 respectively contact the guide groove bottom surfaces 47*a* from both outer sides of the tubular portion 42, whereby a position in the Y direction and inclination about the X direction are restricted.

The guide grooves 47 are preferably formed to guide the guided portions 58 before the end parts of the separation walls 66 near the other end side opening 42*h*2 (−Z side) of the tubular portion 42 reach the position of the inner peripheral surface 43 to be contacted by the sealing ring 52 (sealing position P) (see FIGS. 6A, 6B, 7A and 7B). This positional relationship is more specifically described in the description of an inserting operation of the connector cover 50.

Note that it is not essential that the guide grooves 47 are formed on the side of the resin housing 40 and the guided portions 58 are formed in the resin cover portion 60. A resin cover portion may be formed with guide grooves, and a resin housing may be formed with guided portions to be guided by the guide grooves.

<Operation during Assembling>

An operation example of assembling the connector cover 50 with the terminal block 30 is described with reference to FIGS. 6A to 9B. FIGS. 6A, 6B, 7A, 7B, 9A and 9B show a relationship between the positions of the separation walls 66 with respect to the inner peripheral surface 43 and the positions of the guided portions 58 with respect to the guide grooves 47 during the insertion of the connector cover 50.

Figure 6B:
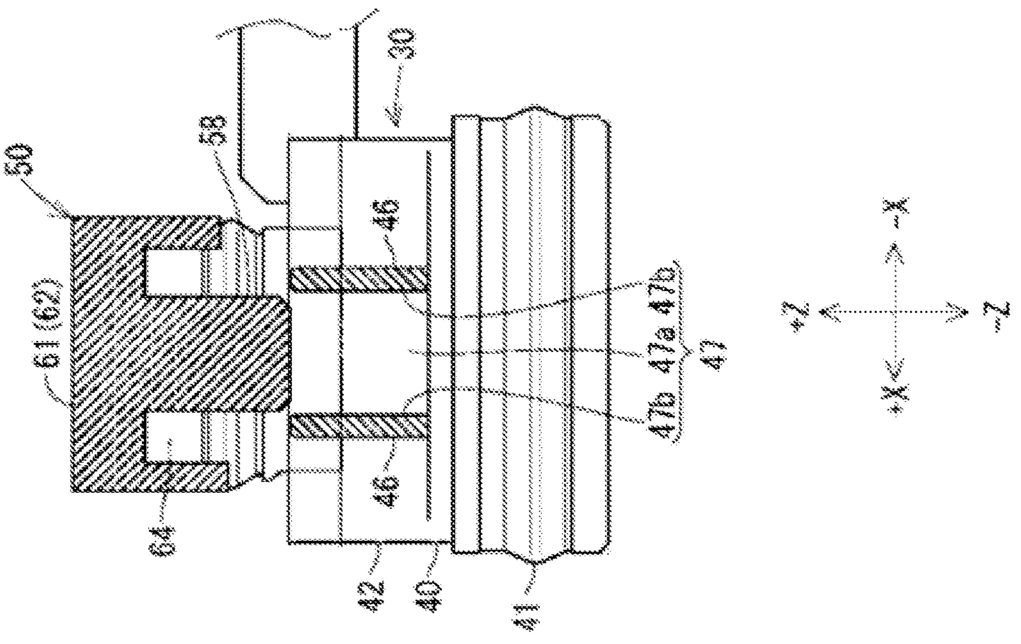
FIGS. 6A and 6B are views showing a state in which the connector cover is being inserted into a terminal block.
Figure 6A:
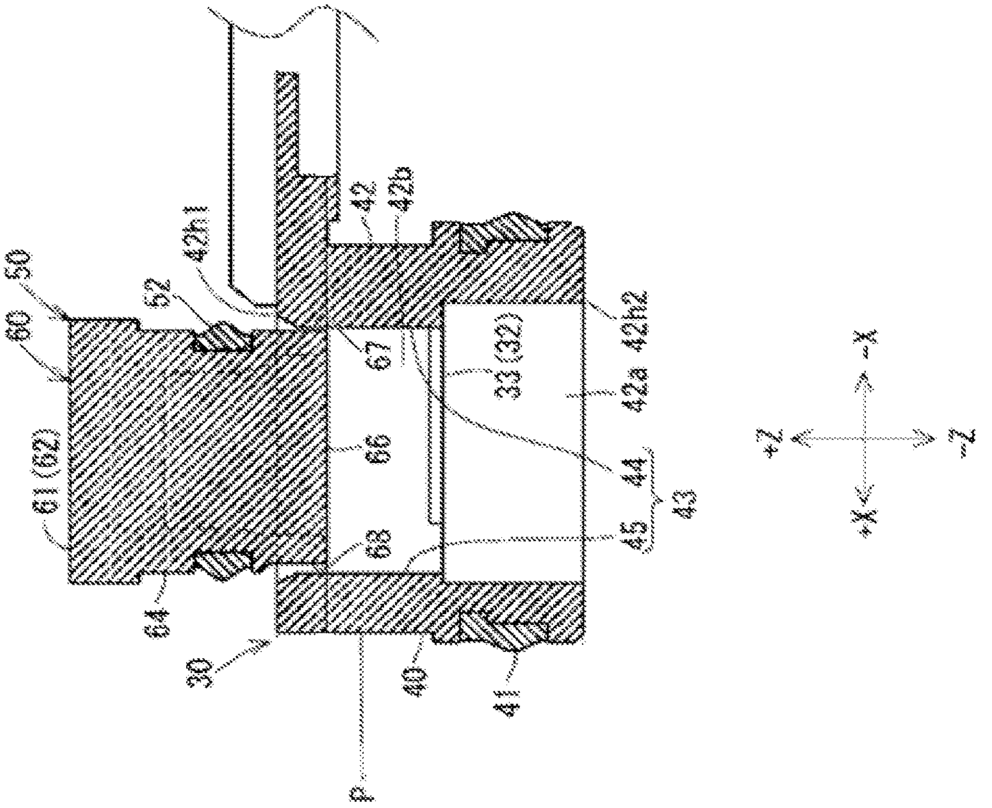

It is assumed that the terminal block 30 is mounted in the device-side terminal block 14 and the terminals 32 are fastened to the terminals 16 by screwing or the like. In this state, as shown in FIGS. 6A and 6B, the connector cover 50 is mounted on the terminal block 30.

First, the separation walls 66 on the tip side of the inserting portion 64 are inserted into the tubular portion 42. The inserting portion 64 may be inserted, for example, by fastening the screws S inserted through the screw fixing portions 63 to nuts on the side of the device 10. If the inserting portion 64 is inserted by screwing, an inserting operation is facilitated, but there is a possibility that strong interference of the separation walls 66 with the inner peripheral surface 43 is not noticed or known. With the guided portions 58 arrived at the entrances of the guide grooves 47, the tip parts of the separation walls 66 are in the tubular portion 42, but have not reached the sealing position P yet.

Figure 7B:
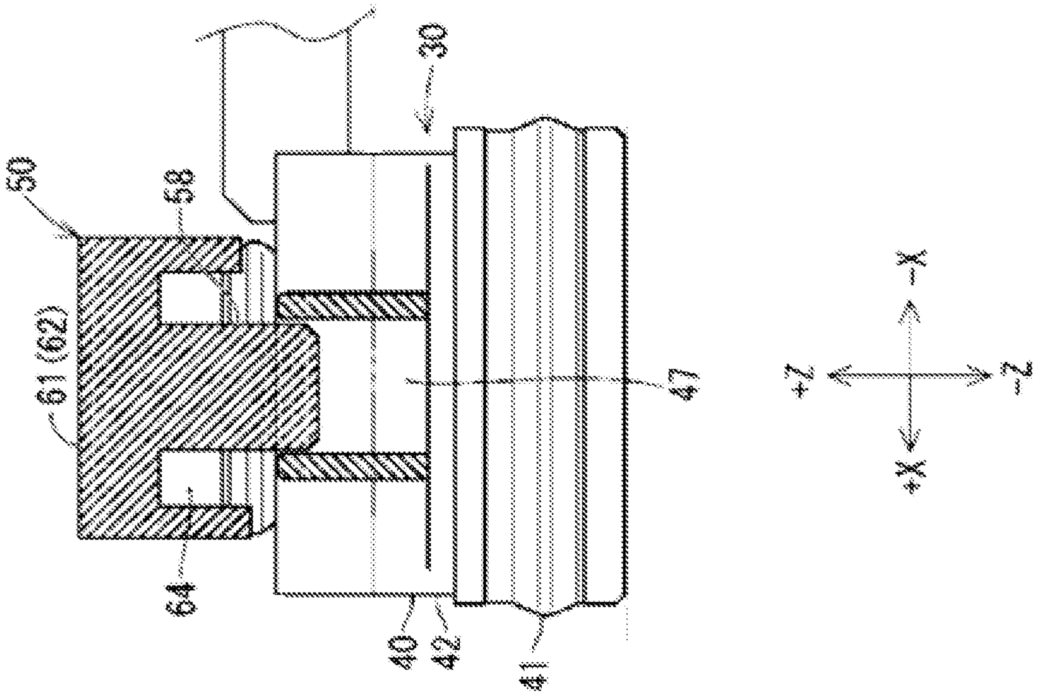
FIGS. 7A and 7B are views showing a state in which the connector cover is being inserted into the terminal block.
Figure 7A:
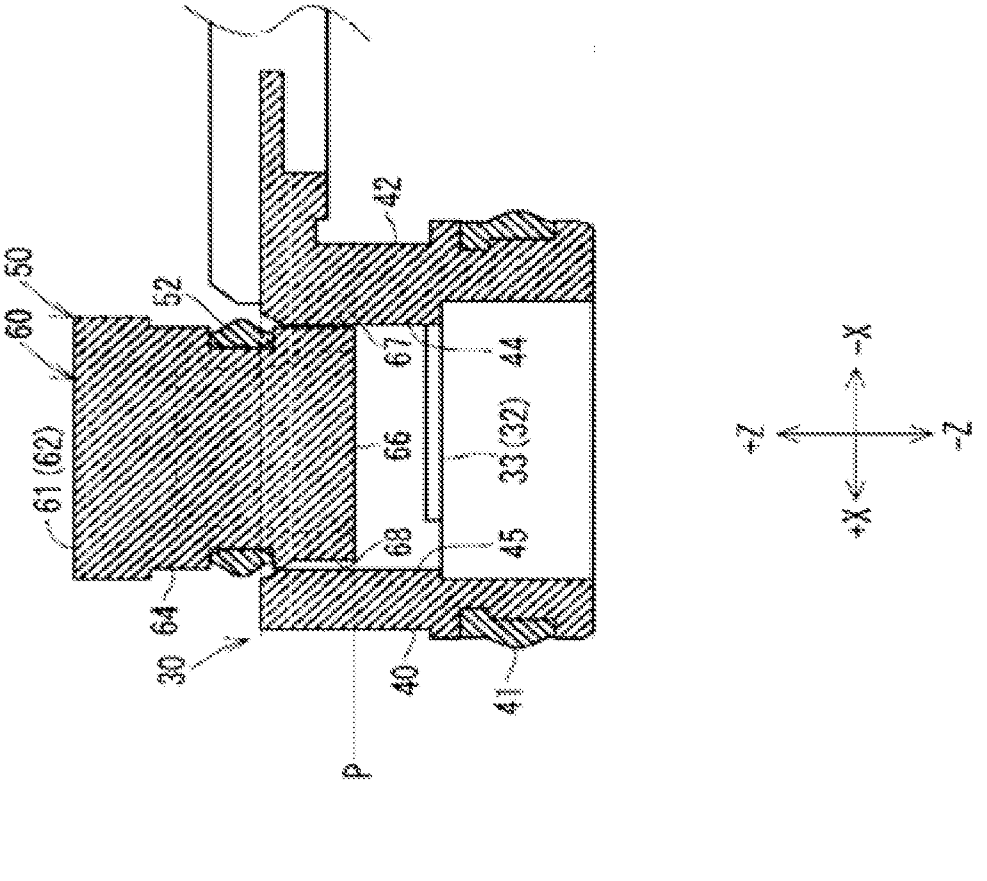

As shown in FIGS. 7A and 7B, with the tip parts of the separation walls 66 arrived at the sealing position P, the guided portions 58 are guided by the guide grooves 47. Thus, the guide grooves 47 guide the guided portions 58 before the tips of the separation walls 66 reach the sealing position P. Thus, it is suppressed that the inserting portion 64 is largely inclined to strongly press the tips of the separation walls 66 against the inner peripheral surface 43 with the tip parts of the separation walls 66 arrived at the sealing position P.

It is considered to provide some gaps between the pair of guide side surfaces 47*b* of the guide groove 47 and the guided portion 58 in consideration of insertion workability of the guided portion 58 into the guide groove 47. In this case, with the guided portions 58 slightly inserted in the guide grooves 47, it is supposed that the inserting portion 64 and the separation walls 66 are allowed to be somewhat inclined with respect to the tubular portion 42.

Figure 8:
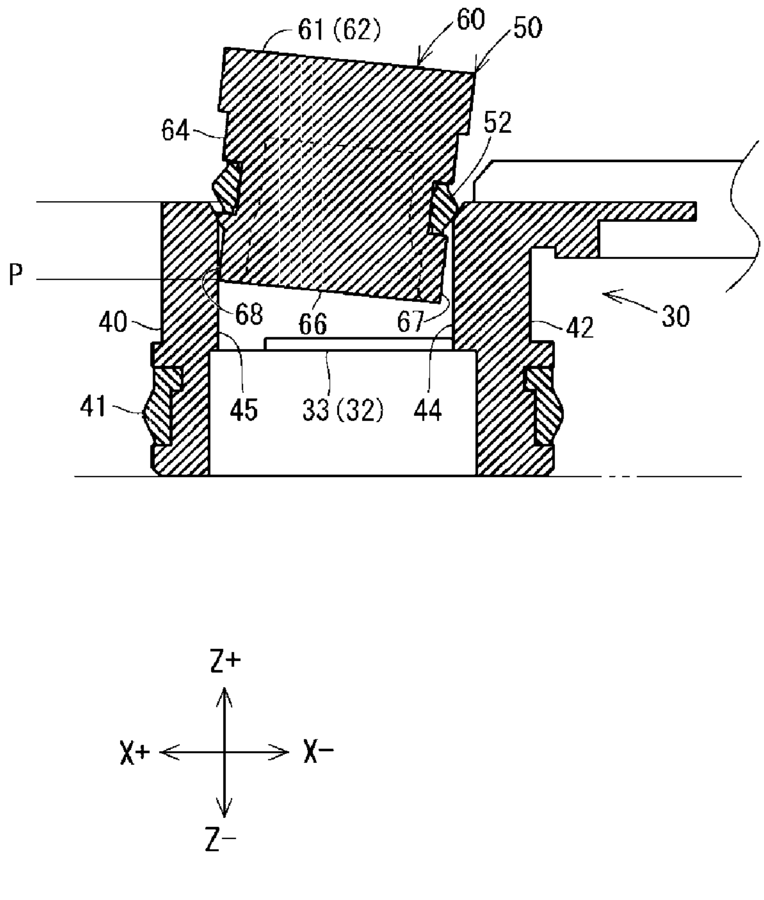
FIG. 8 is a view showing a state where separation walls are in contact with the inner peripheral surface of the tubular portion.
Figure 9B:
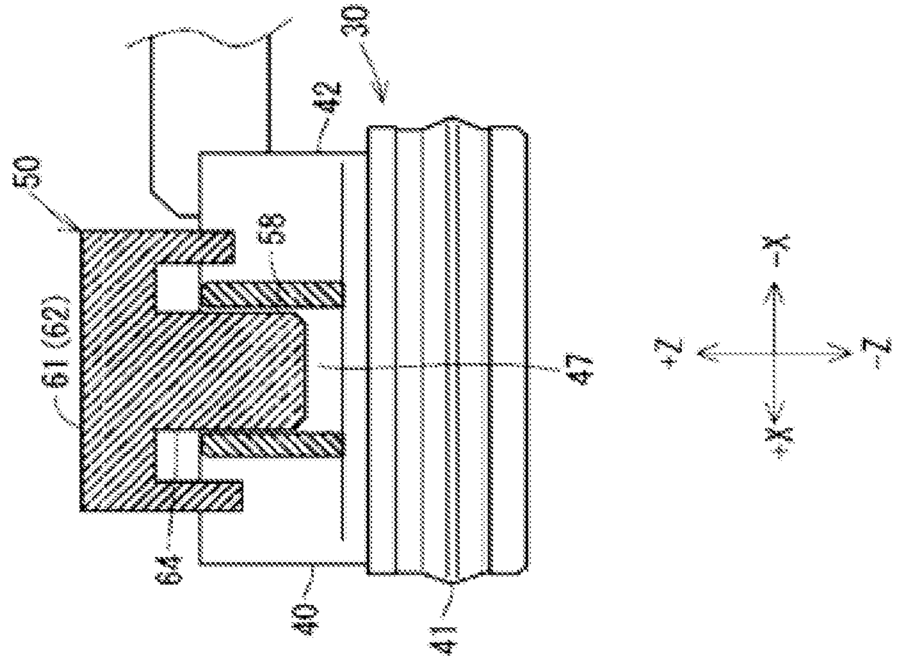
FIGS. 9A and 9B are views showing a state in which during the insertion of the connector cover is being inserted into the terminal block.
Figure 9A:
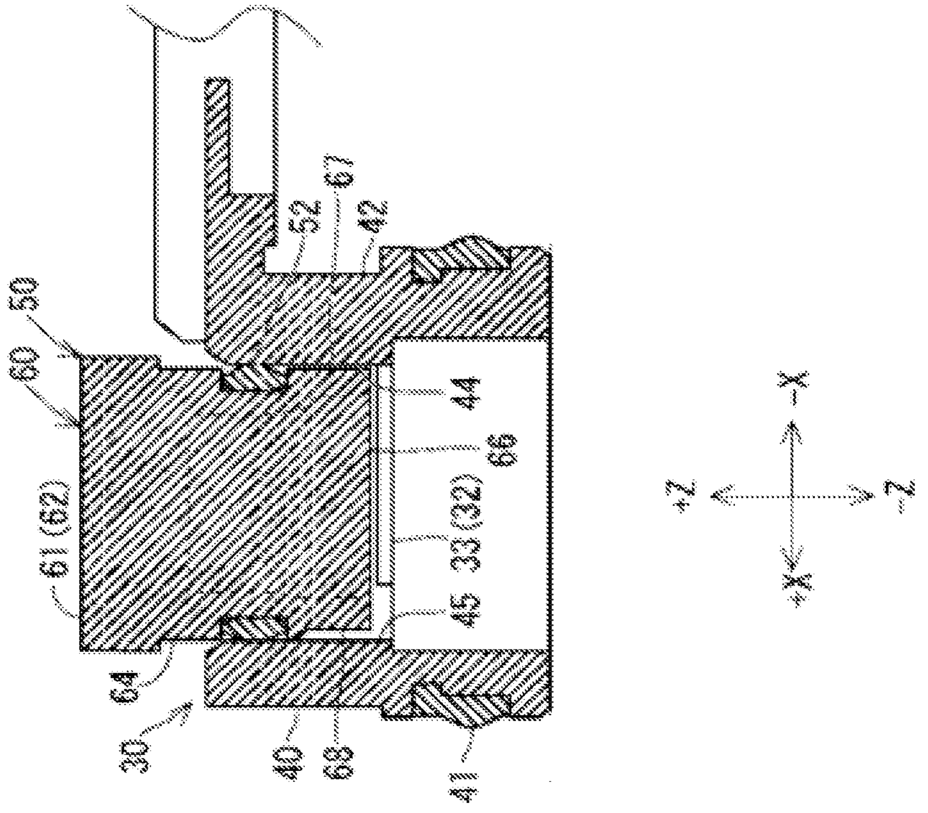

Then, as shown in FIG. 8, the corner parts on the tips of the separation walls 66 are supposed to contact the first or second partial inner peripheral surface 44, 45. In this case, as described above, the corner parts of the separation walls 66 and the outward facing surfaces of the second ribs 68 simultaneously contact the second partial inner peripheral surface 45. Thus, a contact pressure is dispersed to the corner parts of the separation walls 66 and the outward facing surfaces of the second ribs 68 and the second partial inner peripheral surface 45 is less likely to be deformed. Alternatively, the corner parts of the separation walls 66 and the outward facing surfaces of the first ribs 67 simultaneously contact the first partial inner peripheral surface 44. Thus, the contact pressure is dispersed to the corner parts of the separation walls 66 and the outward facing surfaces of the first ribs 67 and the first partial inner peripheral surface 44 is less likely to be deformed.

Thus, the first and second partial inner peripheral surfaces 44, 45 are easily maintained as smooth flat surfaces suitable for sealing by contact with the sealing ring 52.

If the inserting portion 64 is further pushed to a back side, the annular top part 52*t* of the sealing ring 52 reaches the sealing position P and contacts the smooth first and second partial inner peripheral surfaces 44, 45 to achieve good sealability.

Effects, Etc.

According to the device connector 20 configured as described above, the separation walls 66 extend toward the tip side in the inserting direction with respect to the sealing ring 52. Thus, if the connector cover 50 is inserted into the tubular portion 42, there is a possibility that outward facing parts of the separation walls 66 on the tip side in the inserting direction abut on the inner peripheral surface 43 of the tubular portion 42. Even if the separation walls 66 abut on the inner peripheral surface 43, the first ribs 67 extending along the first partial inner peripheral surface 44 or the second ribs 68 extending along the second partial inner peripheral surface 45 abut on the inner peripheral surface 43. Thus, a contact area of the resin cover portion 60 and the inner peripheral surface 43 can be increased as compared to the case where the first and second ribs 67, 68 are absent. In this way, a contact pressure of the separation walls 66 with the inner peripheral surface 43 of the tubular portion 42 can be reduced as much as possible when the connector cover 50 is inserted into the resin housing 40.

Further, it is supposed that hollow spaces for accommodating the head parts and the like of the screws for connecting the terminals 16, 32 are formed in the inserting portion 64. Thus, the inserting portion 64 has a tubular shape, and an inward deforming force is supposed to be applied by the sealing ring 52 being pressed against the inner peripheral surface 43. If the first and second ribs 67, 68 extend up to the inserting portion 64, the inserting portion 64 can be made less likely to be deformed by the first and second ribs 67, 68. In this way, sealability by the sealing ring 52 can be enhanced between the tubular portion 64 and the inner peripheral surface 43 of the tubular portion 42.

Further, if the second ribs 68 extend to connect between the plurality of separation walls 66, the insulation distance between the connecting portions 33 can be increased while the strength of the separation walls 66 and the inserting portion 64 is improved. By improving the strength of the inserting portion 64, sealability by the sealing ring 52 can be enhanced between the tubular portion 64 and the inner peripheral surface 43 of the tubular portion 42 similarly to the above.

Further, by providing the gap between the second ribs 68 and the second partial inner peripheral surface 45, the inserting portion 64 is easily inserted into the tubular portion 42. Particularly, by being combined with a configuration in which the second ribs 68 extend to connect between the plurality of separation walls 66, a configuration for easily inserting the inserting portion 64 into the tubular portion 42 while increasing the insulation distance between the connecting portions 33 on the tip sides of the connecting portions 33 can be realized.

Further, if the resin cover portion 60 is harder than the resin housing 40, a sealed state is easily maintained by pressing the resin housing 40 by the hard-to-deform resin cover portion 60.

Further, in the section T in the inserting direction (Z direction) of the inserting portion 64 from the sealing position P to the position at least partially overlapping the separation walls 66, a part of the inner peripheral surface 43 of the tubular portion 42 including the sealing position P can be reduced to such an extent that the separation walls 66 can be passed if the first and second partial inner peripheral surfaces 44, 45 are facing each other at a constant interval in the projecting direction (X direction) of the connecting portions 33. In this way, the resin cover portion 60 can be reduced in size. Further, the entire terminal block 30 can be reduced in size.

If the interval between the first and second partial inner peripheral surfaces 44, 45 is reduced at the sealing position P, the separation walls 66 are thought to contact these inner peripheral surfaces 44, 45. Thus, a configuration for dispersing a contact pressure by the first and second ribs 67, 68 as described above is more effective.

If parts of the connector cover 50 to be inserted into the tubular portion 42 and closest to the first and second partial inner peripheral surfaces 44, 45 at the tip side are the separation walls 66, the separation walls 66 easily abut on the first and second partial inner peripheral surfaces 44, 45. In such a case, a contact pressure of the separation walls 66 with the inner peripheral surface 43 can be effectively reduced by the first and second ribs 67, 68.

Further, the cover body portion 61 includes the screw fixing portions 63 to be fixed to the device 10, which is a device to be attached, by screwing. Even if the separation walls 66 abut on the inner peripheral surface 43 before or at the time of screw tightening, the contact pressure of the separation walls 66 with the inner peripheral surface 43 can be effectively reduced by the first and second ribs 67, 68.

Further, since the guide grooves 47 guide the guided portions 58 so that the tip parts of the separation walls 66 reach the sealing position P, the separation walls 66 are less likely to contact the inner peripheral surface 43 at the sealing position P. In this way, parts of the inner peripheral surface 43 to be contacted by the sealing ring 52 are easily maintained as smooth surfaces suitable for sealing.

Note that the respective components described in the above embodiment and the respective modifications can be appropriately combined as long as these components do not contradict each other.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A device connector, comprising:

a terminal block including a resin housing having a hollow housing portion and three or more terminals each having a connecting portion; and a connector cover detachably mounted to cover a first opening of one end side of the hollow housing portion, the hollow housing portion having an inner peripheral surface including a first partial inner peripheral surface and a second partial inner peripheral surface facing the first partial inner peripheral surface, the three or more terminals being supported while being partially covered by the resin housing with the respective connecting portions located in the hollow housing portion, the three or more connecting portions projecting from the first partial inner peripheral surface toward the second partial inner peripheral surface while being arranged at intervals in an arrangement direction intersecting a penetration direction of the hollow housing portion in the hollow housing portion, the connector cover including a cover body portion, an inserting portion to be inserted into the hollow housing portion, a resin cover portion having a plurality of separation walls extending from the inserting portion toward a second end side of the hollow housing portion and a sealing ring configured to contact the inner peripheral surface of the hollow housing portion by being mounted on an outer periphery of the inserting portion, the plurality of separation walls respectively extending further toward a second opening of the second end side of the hollow housing portion than the connecting portions at positions for partitioning the three or more connecting portions and overlapping from base ends to tips of the three or more connecting portions in a projecting direction of the connecting portions, and the resin cover portion further including first ribs extending from first end parts of the plurality of separation walls located on base end sides of the connecting portions and near the second opening of the second end side of the hollow housing portion along the first partial inner peripheral surface and second ribs extending from second end parts of the plurality of separation walls located on tip sides of the connecting portions and near the second opening of the second end side of the hollow housing portion along the second partial inner peripheral surface.

2. The device connector of claim 1, wherein the first and second ribs extend up to the inserting portion.

3. The device connector of claim 1, wherein the second ribs extend to connect between the plurality of separation walls.

4. The device connector of claim 1, wherein a gap is provided between the second ribs and the second partial inner peripheral surface.

5. The device connector of claim 1, wherein a Rockwell hardness value HR of the resin cover portion is larger than a Rockwell hardness value HR of the resin housing.

6. The device connector of claim 1, wherein the first and second partial inner peripheral surfaces are facing each other at a constant interval in the projecting direction of the connecting portions in a section in an inserting direction of the inserting portion from a sealing position by the sealing ring to a position at least partially overlapping the separation walls.

7. The device connector of claim 1, wherein parts of the connector cover to be inserted into the hollow housing portion and closest to the first and second partial inner peripheral surfaces on a tip side in the inserting direction are the separation walls.

8. The device connector of claim 1, wherein the cover body portion includes a screw fixing portion to be screwed to a device to be attached.

9. The device connector of claim 1, wherein:

one of the terminal block and the connector cover includes a guide groove and the other includes a guided portion to be guided by the guide groove, the guide groove is a groove for restricting a passage route of the inserting portion in the hollow housing portion, and the guide groove is formed to guide the guided portion before end parts of the separation walls near the second opening of the second end side of the hollow housing portion reach a contact position of the inner peripheral surface with the sealing ring.

* * * * *